United States Patent [19]

Zahid

[11] 4,181,156

[45] Jan. 1, 1980

[54] PRESSURE ACCUMULATOR WITH ANTI-EXTRUSION GAS CHARGING VALVE ASSEMBLY

[75] Inventor: Abduz Zahid, Los Angeles, Calif.

[73] Assignee: Greer Hydraulics, Inc., Chatsworth, Calif.

[21] Appl. No.: 966,377

[22] Filed: Dec. 4, 1978

[51] Int. Cl.[2] .......... F16L 55/04

[52] U.S. Cl. .......... 138/30

[58] Field of Search .......... 138/26, 30; 220/85 B

[56] References Cited

U.S. PATENT DOCUMENTS

| | | | |
|---|---|---|---|
| 2,721,580 | 10/1955 | Greer | 138/30 |
| 2,801,067 | 7/1957 | Mercier | 138/30 X |
| 3,067,776 | 12/1962 | Love | 138/30 |
| 3,346,014 | 10/1967 | Jacuzzi | 138/30 |
| 3,580,290 | 5/1971 | Sugimura et al. | 138/30 X |
| 3,881,519 | 5/1975 | Zahid | 138/30 |
| 3,918,497 | 11/1975 | Schon | 138/30 |
| 3,946,759 | 3/1976 | Mercier | 138/30 |
| 4,108,209 | 8/1978 | Zahid | 138/30 |

*Primary Examiner*—Richard E. Aegerter
*Assistant Examiner*—James E. Bryant, III
*Attorney, Agent, or Firm*—Arthur B. Colvin

[57] ABSTRACT

The present invention is directed to a pressure accumulator of the type which includes a rigid container or casing having substantially axially aligned ports in the ends thereof, and having a deformable open mouth bladder therein dividing the casing into a liquid chamber and a gas chamber in communication respectively with said ports, the port in communication with the gas chamber having a rigid fitting associated therewith, with a gas charging passageway extending therethrough and leading into the gas chamber, deformable closure member being associated with said fitting, automatically to seal the end of the passageway leading into the gas chamber upon discharge of gas from said gas chamber, to preclude extrusion of said bladder into said end of the passageway in said rigid fitting with consequent failure of the accumulator.

8 Claims, 2 Drawing Figures

PRESSURE ACCUMULATOR WITH ANTI-EXTRUSION GAS CHARGING VALVE ASSEMBLY

Figure 1:
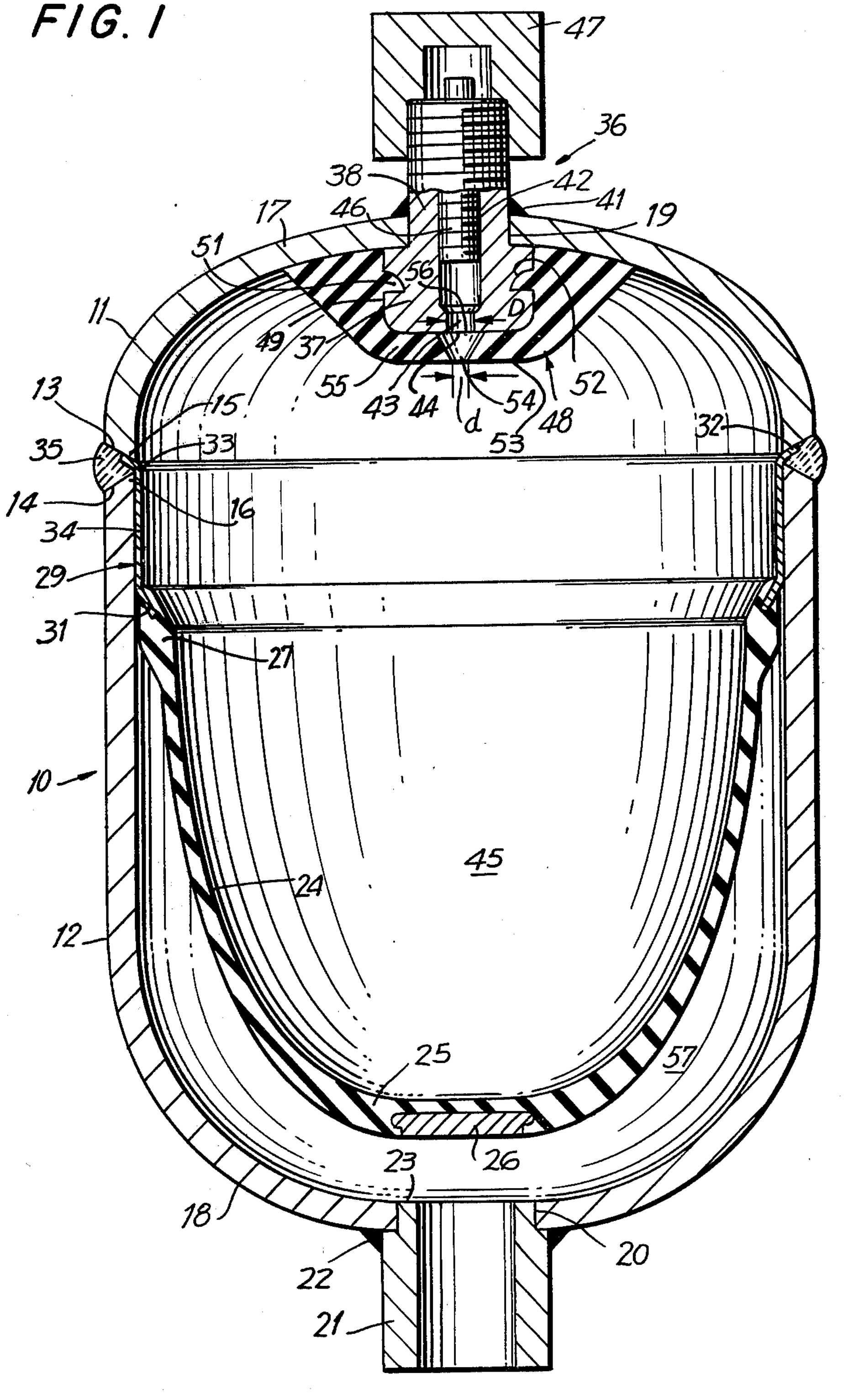

As conducive to an understanding of the invention, it is noted that where in a pressure accumulator of the type comprising a cylindrical container formed from two cup-shaped shells, the mouths of which are juxtaposed and secured together and the closed ends of which each has a port, a bladder of resilient deformable material, having a large mouth, is mounted in the container by means of a rigid annular supporting member so that the bladder intervenes between said ports to define a liquid chamber and a gas chamber in communication respectively with said ports, when such accumulator is charged with liquid under pressure, the side wall of the gas charged bladder may deform and fold over the inner end of a passageway in a rigid gas charging fitting secured in one of said ports with consequent extrusion into said passageway, resulting in puncture of the bladder with consequent leakage of gas and failure of accumulator.

Leakage of gas may also occur through the usual gas charging valve which may be of the "Schrader" type, mounted in the rigid gas fitting. As a result, the gradual bleeding of gas from the bladder will result in inoperativeness of the accumulator to serve its intended purpose.

It is accordingly among the objects of the invention to provide an accumulator which employs a conventional wide mouth bladder assembly supported, for example, on the side wall of the accumulator, in combination with an anti-extrusion cap longitudinally spaced from the mouth of the bladder and maintained in position by the gas charging valve fitting, which anti-extrusion cap will permit free communication of gas under pressure into the bladder to charge the latter, but will automatically close to prevent extrusion of the bladder through the passageway in the gas fitting.

The anti-extrusion cap, according to the invention, is associated with a pressure accumulator of the type comprising a cylindrical container, formed from two cup shaped shells, the mouths of which are juxtaposed and secured together and the closed ends of each of which has a port. A bladder of resilient deformable material, having a large open mouth, is mounted in the container by means of a rigid annular supporting member, one edge of which is secured, for example, between the juxtaposed mouths of the shells and the other edge of which is molded in the mouth of the bladder, said bladder intervening between said ports and defining a liquid chamber and a gas chamber in communication respectively with said ports. A gas charging fitting is secured in one of the ports, said gas fitting having a central passageway therethrough, the outer end portion of which mounts, for example, a conventional "Schrader" valve. The inner end of the passageway defines the inlet into the gas chamber defined by the bladder. The gas charging fitting has a base portion extending into the gas chamber, and such base portion mounts a cap formed of an elastomeric material which preferably is of lower durometer than the durometer of the material forming the bladder, so that the cap may readily be deformed by engagement of the bladder thereagainst. The cap is substantially frusto-conical and the truncated end thereof which extends over the inner end or inlet of the gas passageway in the rigid fitting has an axial passageway aligned with and normally in communication with the inlet of the gas passageway and designed so that upon pressure of the bladder against such truncated end of the cap, the cap will deform to close the axial passageway therein, thereby preventing extrusion of the bladder into the inlet end of the passageway with resultant picking out of such bladder and consequent failure thereof.

In the accompanying drawings in which is shown one of various possible embodiments of the several features of the invention.

Figure 2:
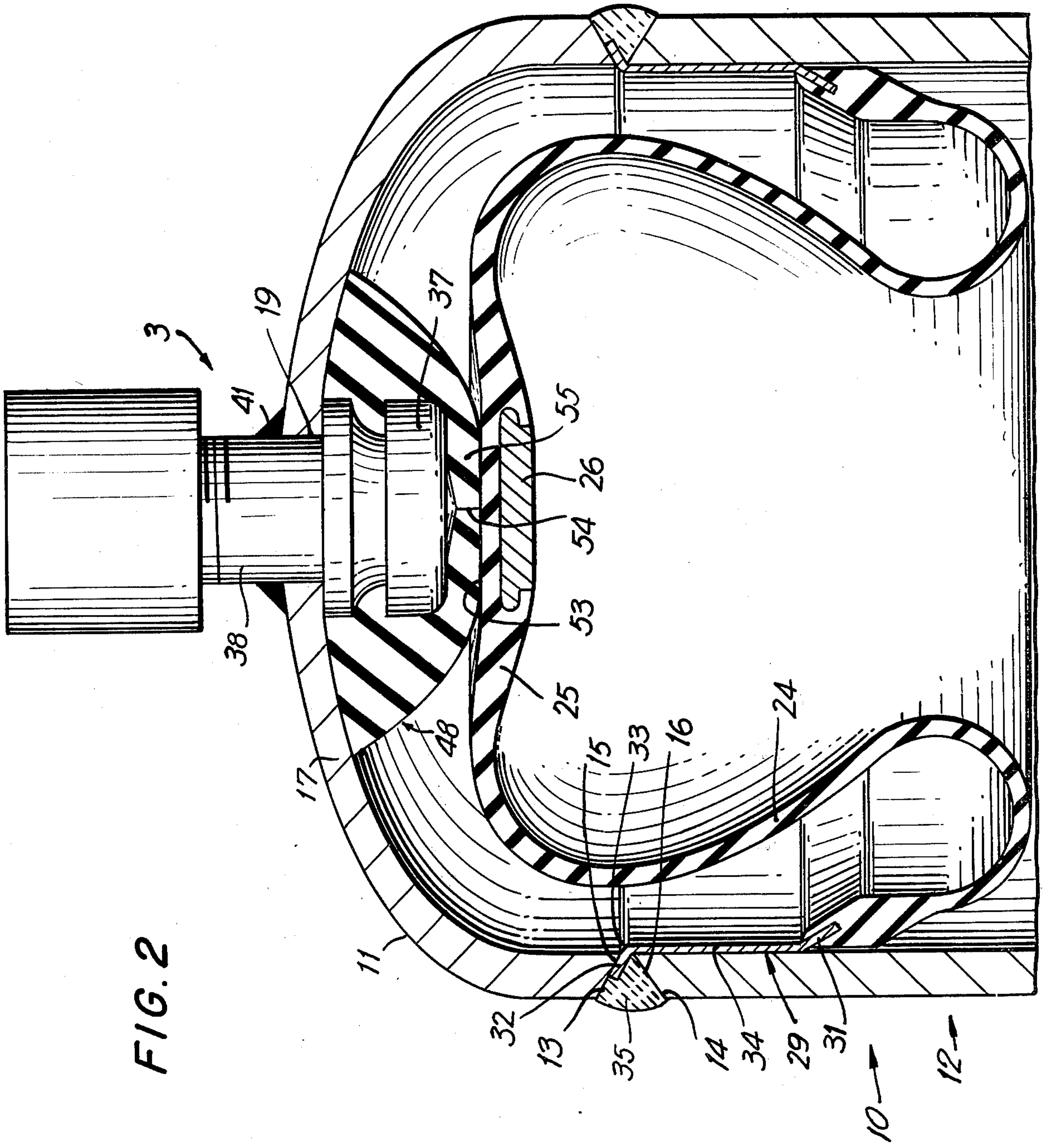

FIG. 1 is a view in longitudinal cross section of an accumulator incorporating the invention herein, and FIG. 2 is a detail view similar to FIG. 1 but on a greatly enlarged scale, showing the anti-extrusion cap, when the bladder has been forced thereagainst.

Referring now to the drawings, the invention illustratively is incorporated in a pressure accumulator which as shown in FIG. 1, comprising a container 10 of rigid material such as steel capable of withstanding relatively high pressure.

The container comprises two complimentary cup shaped shells 11 and 12, the former comprising the cap or cover member for the latter, which defines the body portion of the accumulator.

The rims or mouths, 13 and 14 of the shells are beveled as shown and define a V-shaped annular groove when the rims are aligned with their inner edges, 15, 16 in juxtaposition.

Each of the cup-shaped shells, 11, 12, has a rounded end 17, 18, so that the accumulator is a substantially cylindrical unit having substantially hemispherical ends, each of which has a port 19, 20 therethrough, which are axially aligned.

The port 20 is adapted to receive a fitting 21 which as shown in FIG. 1 may comprise a cylindrical sleeve affixed as by welding as at 22, to the end 18 of shell 12 axially aligned with the periphery of port 20. The inner end of the fitting 21 defines a valve seat 23.

Positioned in the container 10 is a deformable partition, illustratively in the form of a bladder 24 of rubber or similar material having like characteristics. The bladder is closed at one end as at 25 and said closed end has secured thereon and preferably molded integral therewith a rigid button or valve member 26 which is axially aligned with the bladder and designed to move against the valve seat 23 when the bladder is charged, to close the port 20 and thereby prevent extrusion of the bladder.

The mouth 27 of the bladder 24 has a thickened rim portion to which an annular supporting member 29 is affixed by being molded therein as shown. The supporting member 29 is of a relatively thin resilient sheet material such as sheet steel having an inwardly inclined mounting portion 31 at its lower end molded in such thickened rim and an outwardly inclined retaining portion 32 at its upper end. As shown in FIG. 1, the junction 33 between retaining portion 32 and the cylindrical mid-portion 34 of the supporting member 29 is seated on the inner edge 16 of rim 14 of shell 12 and the rim 13 of shell 11 seats on the top surface of retaining portion 32, the rims 13, 14, and retaining portion 32 being secured together as by welding at 35.

According to the invention, a gas charging fitting 36 is provided which has a cylindrical base portion 37 with an axial stem 38 extending outwardly therefrom. The axial stem 38 extends through the gas port 19 and is positioned so that the top surface of the base portion 37, abuts against the inner surface of shell 11, adjacent the periphery of port 19. The fitting is secured in said port 19 as by welding at 41. The gas charging fitting 36 has a longitudinal bore 42 therethrough of reduced diameter at its inner end as at 43, defining a gas passageway, the inlet end 44 of which leads into the gas chamber 45 of the accumulator defined by the interior of bladder 24.

A conventional valve member such as a "Schrader" valve 46 is screwed into the internally threaded enlarged bore portion 42 of the gas fitting and a closure cap 47 may then be screwed on the threaded outer surface of the valve stem 38.

Mounted on the base portion 37 of the gas charging fitting is an anti-extrusion cap member 48. The cap member 48, includes an interior cavity 49 which has an annular rib 51 formed integral therewith. This rib 51 is designed to coact with an annular groove 52 in the base portion 37 of the gas charging fitting 36 dependably to retain the cap member 48 on said base portion 37. As is shown in the drawing, the cap member 48 is in the form of a truncated inverted cone and the smaller diameter end 53 of the cap member 48 has a passageway 54 therethrough axially aligned with the inlet 44 at the inner end of the gas passageway 43. Preferably, the layer 55 of material defining the small diameter surface 53 of the cap member 48 is relatively thick and the axial passageway 54 is also in the form of a truncated cone having its base portion 56 of larger diameter than the diameter "D" of the inlet 44 of the gas passageway 43, and its truncated end "d" of smaller diameter and slightly less than the diameter of the inlet 44 of passageway 43.

The cap member 48 is formed of an elastomeric material which is preferably of lower durometer and hence softer than the material of which the bladder 24 is formed.

In use of the accumulator, the bladder 24 is charged with gas under pressure through the gas charging valve 46 mounted in the fitting 36 in port 19 and such gas under pressure will pass through the passageway 43 and through the normally open axial passageway 54 in cap member 48 into the gas chamber 45 defined by bladder 24 to charge the bladder 24 to cause it to expand so that the wall of the bladder 24 will engage the inner surface of the wall of the container 10 and the valve member 26 will move against the seat 23 to prevent extrusion of the bladder 24.

Thereupon a fluid such as oil under pressure is forced through fitting 21 to charge the liquid chamber 57 with oil under pressure. As a result of the influx of oil under pressure into the accumulator it will cause the bladder to deform and possibly fold inwardly so that the side wall thereof will press against the under surface of cap member 48 as shown in FIG. 2.

Due to the fact that the material of the cap member 48 is of lower durometer than that of the bladder 24 the force exerted by the bladder 24 against the cap member 48 will cause the material thereof to deform thereby closing the axial passageway 54 as shown in FIG. 2. As a result, this will preclude extrusion of the bladder 24 into the inlet end 44 of passageway 43 through the rigid gas charging fitting 36 which could cause pickout of the bladder with resultant failure thereof.

In normal operation, the accumulator may be charged with gas under pressure under a predetermined precharge and also would contain liquid in the liquid chamber thereof which is also under pressure. Under many circumstances, the accumulator may be in standby condition for some extended periods. As a result, there is a possibility that leakage may occur through the "Schrader" valve 46 due, for example, to a defect in the valve; or the presence of dirt which prevents complete seating of the valve member of the "Schrader" valve, thereby permitting a slight escape of gas which, after a long period, may cause complete exhaustion of gas from the bladder. As a result, the bladder would press against the inner end 53 of the cap member 48 which would cause the axial passageway 54 therein to close in the manner previously described to prevent damage to the bladder 24 with resultant failure of the unit. If not for the presence of such readily deformable cap member 48 and if the bladder pressed against a rigid opening such as the inlet end 44 of the passageway in the gas charging fitting, pickout of the bladder could occur.

Due to the provision of a deformable anti-extrusion cap member 48 which is separate and distinct from the wide mouth bladder 24, which is secured to the side wall of the container 10, it is possible to have the durometer of the bladder material greater then the durometer of the anti-extrusion cap member 48, thereby facilitating deforming of said cap member 48 when the bladder 24 presses thereagainst to insure closure of the axial passageway 54 in the cap member 48 thereby precluding extrusion of the bladder 24.

As many changes could be made in the above construction and many apparently widely different embodiments of this invention could be made without departing from the scope of the claims, it is intended that all matter containing the above description, or shown in the accompanying drawings be interpreted as illustrative and not in a limiting sense.

Having thus described my invention, what I claim as new and desire to secure by Letters Patent of the United States is:

1. A pressure vessel comprising a container of rigid material having a liquid port at one end and gas port at its opposite end axially aligned therewith, a deformable bladder of resilient material in said container between said ports, a gas charging fitting extending through said gas port and secured therein, said fitting having a base portion in said container and an axial stem protruding from said container, an axial bore extending through said base portion and stem, said bore having an inner end and an outer end, an internally threaded portion near the outer end of the bore, a gas charging valve adapted to be mounted in said internally threaded outer end portion, a deformable cap mounted on said base portion, said cap having a relatively thick portion thereof extending across the base portion over the inner end of the bore the extending portion of said cap having a tapered passageway therethrough axially aligned with the inner end of said bore in said gas charging fitting, said tapered passageway in the extending portion of the cap being in the form of a truncated cone having its wider diameter base end adjacent the inner end of said bore and its smaller diameter truncated end remote from the inner end of said bore, said extending portion of the cap being of a thickness, and the tapered passageway being of a length, whereby the portion of the cap surrounding the truncated end of the passageway is generally radially inwardly deformable relative to and across said passageway to effect a sealing of said passageway upon forceable engagement of the deformable bladder against the portion of the cap about the truncated end.

2. The pressure vessel of claim 1 in which said bladder has a mouth at one end and is closed at its other end, an annular supporting member, said annular supporting member having an annular mounting portion at one edge secured in the mouth portion of said bladder, and having an annular mounting portion at its other edge secured to the sidewall of the container spaced from the gas port therein, said bladder being formed independently of said deformable cap.

3. The pressure vessel set forth in claim 2 in which the durometer of the material of said deformable cap is less than the durometer of the material of said bladder.

4. The pressure vessel set forth in claim 3 in which said deformable cap is snap fitted over said base portion of said gas charging fitting 5. The pressure vessel set forth in claim 4 in said deformable cap has a recess therein adapted to accommodate the base portion of said gas charging fitting securely to be retained thereon.

6. The pressure vessel set forth in claim 5 in which the recess in said cap has an annular rib and the base portion has an annular groove releasably to accommodate said annular rib.

7. The pressure vessel of claim 3 wherein the base end of the passageway is of a greater diameter than the diameter of the inner end of said bore.

8. The pressure vessel of claim 7 wherein the truncated end of said passageway is of a smaller diameter than the diameter of the inner end of said bore.

* * * * *